(12) United States Patent
Nambannor Kunnath et al.

(10) Patent No.: US 10,887,835 B2
(45) Date of Patent: Jan. 5, 2021

(54) REDUCING POWER CONSUMPTION AMONG MULTIPLE USER DEVICES

(71) Applicant: VMWARE, INC., Palo Alto, CA (US)

(72) Inventors: Ramanandan Nambannor Kunnath, Bangalore (IN); Ashish Maan, Bangalore (IN); Shanti Kamichetty, Bangalore (IN); Bala Subrahmanyam Gangu, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 77 days.

(21) Appl. No.: 16/391,348

(22) Filed: Apr. 23, 2019

(65) Prior Publication Data

US 2020/0245243 A1    Jul. 30, 2020

(30) Foreign Application Priority Data

Jan. 24, 2019  (IN) .............................. 201941002912

(51) Int. Cl.
*H04L 12/28* (2006.01)
*H04W 52/02* (2009.01)
*G06F 1/329* (2019.01)
*G06F 1/3231* (2019.01)

(52) U.S. Cl.
CPC ........ *H04W 52/0219* (2013.01); *G06F 1/329* (2013.01); *G06F 1/3231* (2013.01); *H04W 52/0251* (2013.01)

(58) Field of Classification Search
CPC ........................................................ H04L 12/28
USPC ........................................................ 370/329
See application file for complete search history.

(56) References Cited

U.S. PATENT DOCUMENTS

2015/0168175 A1* 6/2015 Abramson ............. G01C 21/34
701/408

* cited by examiner

*Primary Examiner* — Dang T Ton
(74) *Attorney, Agent, or Firm* — Clayton, McKay & Bailey, PC (57) ABSTRACT

Examples described herein include systems and methods for reducing power consumption among multiple user devices that are communicatively coupled to a management server. The management server can receive an indication that a first user device (a laptop computer, for example) is in an active state and that a first application (an email application or a web browser, for example), is executing at the laptop computer. The management server determines that a second user device (a smartphone, for example) is associated with the same user and further determines that a second application is installed on the smartphone. The management server can determine that the smartphone is in an inactive state or that the second application is currently not executing on the smartphone. The management server sends an instruction to the smartphone to turn off at least one functionality so as to reduce power consumption.

20 Claims, 5 Drawing Sheets

REDUCING POWER CONSUMPTION AMONG MULTIPLE USER DEVICES

RELATED APPLICATIONS

Benefit is claimed under 35 U.S.C. 119(a)-(d) to Foreign Application Serial No. 201941002912 filed in India entitled "REDUCING POWER CONSUMPTION AMONG MULTIPLE USER DEVICES", on Jan. 24, 2019, by VMWARE, INC., which is herein incorporated in its entirety by reference for all purposes.

BACKGROUND

Many corporations use a networked system of computing platforms to perform various activities such as providing communications between employees and exchanging various types of information and data. The computing platforms can include various user devices such as a desktop computer, a laptop computer, a tablet computer, and a smartphone. In many cases, an employee may utilize two or more user devices to execute various tasks. For example, the employee may use a smartphone to access an email server and check for emails while on his/her way to work. Upon reaching the workplace, the employee may power up his/her desktop computer and use the desktop computer to check for emails, as well as to execute other tasks. Typically, the employee sets aside the smartphone without powering down the device. In this condition, the smartphone continues to access the email server, thereby redundantly executing several email related activities that are being carried out by the desktop computer at this time. Such redundant activities lead to an unnecessary drain on the battery in the smartphone.

As another example, an employee uses a word processing program on a laptop computer to generate a document while on his/her way to work. Upon reaching the workplace, the employee transfers the document to his/her desktop computer that is connected to the laptop computer via a corporate network, and continues to work upon the document. Often at this time, the laptop computer is left unattended, thereby leading to an unnecessary drain on the battery in the laptop computer or on power provided via a mains power outlet to the laptop computer.

Consequently, a need exists for providing systems and methods that reduce power consumption in user devices that are in an inactive state or are operating in a redundant manner.

SUMMARY

Examples described herein include systems and methods for reducing power consumption among a set of user devices used by a user. An example method includes receiving, at a management server, an indication that a first user device is in an active state and that a first application is executing at the first user device. The first user device can be, for example, a laptop computer, and the first application can be an email application such as Microsoft Outlook® or Gmail®. The management server can be a corporate server computer that is accessible by a number of client devices such as the laptop computer. Upon receiving the indication from the first user device that the first user device is in an active state and that the first application is executing at the first user device, the management server determines that a second user device is associated with the same user. The determination can be made by using a registry (or other information source) containing information of various user devices that are associated with the user. In one exemplary implementation, the registry includes information of various user devices that have been issued by a company to various employees, including the first user device and the second user device issued to the user.

After determining that the second user device is associated with the user, the management server determines that a second application is installed on the second user device. The second user device can be a smartphone for example, and the second application can be an email application configured to execute on the smartphone. The method further includes the management server determining that the second user device is in an inactive state or that the second application is currently not executing on the second user device. For example, the smartphone may be in an airplane mode of operation or the user has not opened an email application in the smartphone. The management server then sends an instruction to the second user device to turn off at least one functionality associated with the second user device or the second application. Accordingly, for example, the smartphone can be automatically placed in a power down mode or turned off, so as to conserve battery power.

The example method summarized above can be incorporated into a non-transitory, computer-readable medium having instructions that, when executed by a processor associated with a computing device, cause the processor to perform the actions described. Additionally, the example method summarized above can be implemented in a system including, for example, a management server, a first user device, and a second user device that are communicatively coupled to each other through a network.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts. Certain words that are used in this disclosure can have various equivalencies and are not intended to be limiting or exclusionary. For example, words such as "information" and "data" can be used interchangeably to convey the same meaning in the context of the matter described in this disclosure.

Examples described herein include systems and methods for reducing power consumption among multiple user devices that are communicatively coupled to a management server. The management server can receive an indication that a first user device (a laptop computer, for example) is in an active state and that a first application (an email application or a web browser, for example) is executing at the laptop computer. The management server determines that a second user device (a smartphone, for example) is associated with the same user and further determines that a second application is installed on the smartphone. The management server can determine that the smartphone is in an inactive state or that the second application is currently not executing on the smartphone. The management server sends an instruction to the smartphone to turn off at least one functionality so as to reduce power consumption.

Figure 1:
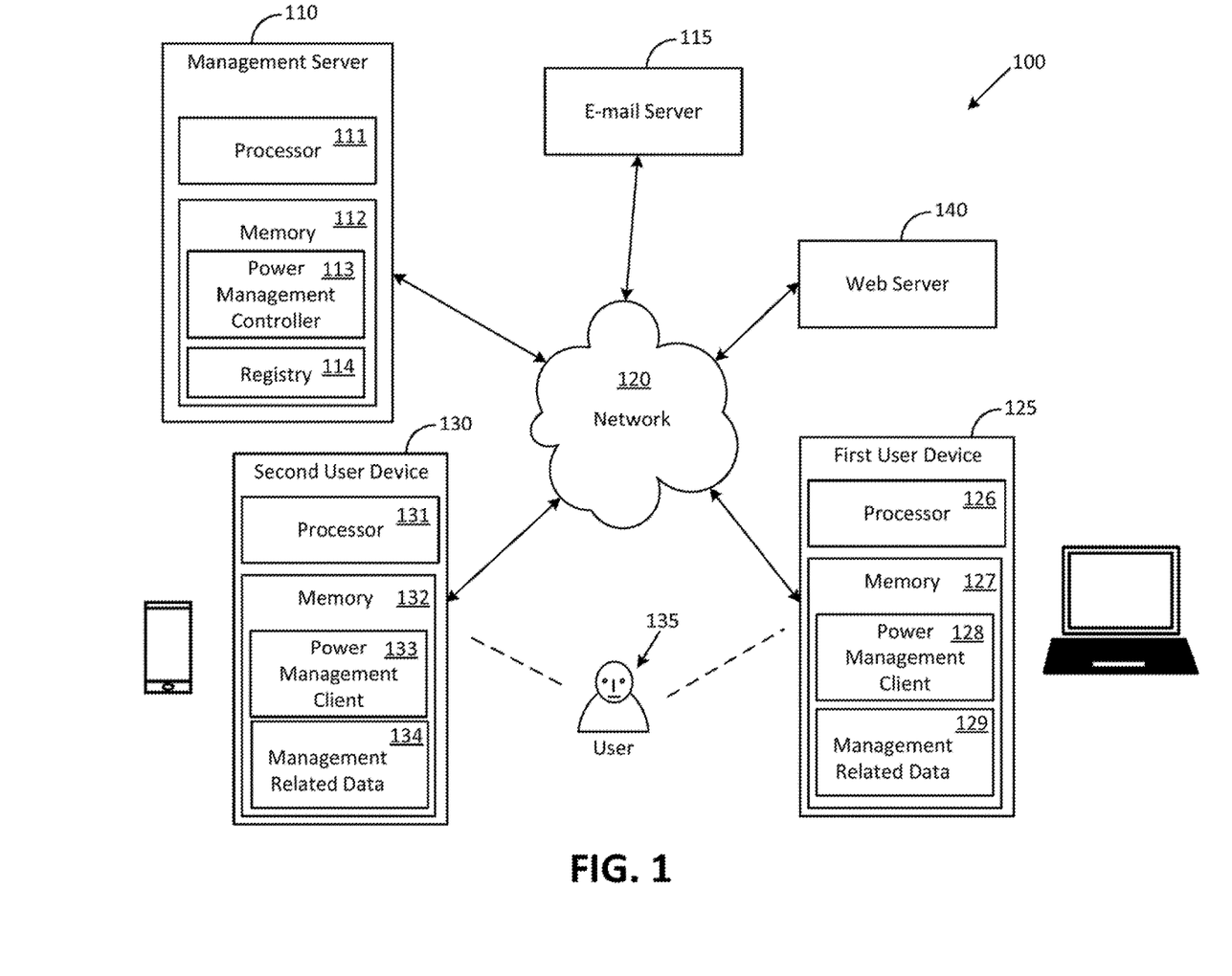
FIG. 1 is an illustration of an example system configured to carry out exemplary methods disclosed herein.

FIG. 1 is an illustration of an example system 100 configured to carry out exemplary methods disclosed herein. The system 100 can at least include a management server 110, a first user device 125, and a second user device 130 that are communicatively coupled to each other through a network 120. The system 100 can also include various other elements such as an email server 115 and an Internet web server 140. Though shown as single blocks or entities, the elements and components shown in FIG. 1 can be implemented using multiple elements and configurations. For example, each of the management server 110, the email server 115, and the Internet web server 140 can be implemented in the form of a network of multiple computers or servers that are communicatively coupled to each other. In some examples, one or more of the management server 110, email server 115, or Internet web server 140 can be a part of the same server architecture.

In one example implementation, the management server 110 includes a processor 111 and a memory 112. The processor 111 can access the memory 112 to execute non-transitory instructions stored in the memory 112 for implementing various software programs such as used for implementing the power management controller 113. The term "memory" is understood to include a local or remote storage location in this context. The processor 111 can also access the memory 112 to obtain various types of information such as those stored in a registry 114. Operations associated with the registry 114 and the power management controller 113 will be described below in more detail. The memory 112 can be implemented in various ways such as in the form of one or more memory devices mounted upon a printed circuit board located in the management server 110 or in the form of a distributed architecture that can include cloud storage components.

Each of the first user device 125 and the second user device 130 can be one of various computational device used by a user 135. For example, the first user device 125 can be a laptop computer that is issued by a corporation to the user 135 when the user 135 is an employee of the corporation. The second user device 130 can be, for example, a smartphone that is issued by the corporation to the user 135 when the user 135 is an employee of the corporation. In some cases, the smartphone or laptop can be independently owned by the user 135. When independently owned by the user 135, the smartphone can be used for personal matters such as accessing personal email or surfing the web, and can also be used for performing work-related activities such as accessing work-related emails. The first and second user devices 125, 130 can be enrolled at the management server 110 and managed by the management server 110. That is, the management server 110 can retain authority to cause the devices 125, 130 to perform certain actions in certain situations, as determined by the management server 110 or an administrator accessing the management server 110.

The first user device 125 can include a memory 127 having stored thereon a power management client 128. The power management client 128 can be a standalone application or part of another application such as a management agent or a portal application. The power management client 128 can include privileges that allow it to communicate with the management server 110. The power management client 128 can be a software application that is downloadable by the user 135 from the management server 110 or obtainable from other approved sources. The power management client 128 can include a user interface that can be used by the user 135 for carrying out certain operations such as transmitting messages to the management server 110 (or an administrator of the management server 110) and for obtaining a response from the management server 110.

In some examples, the power management client 128 is invisible to the user and executes in the background of another application. For example, a portal application can include the power management client 128 and provide a user interface that includes various icons corresponding to available applications. The portal application can launch an application based on the user's selection of an icon. It can also store credentials for the user and offer it to the various applications on behalf of the user, preventing the need to login separately to each application. The portal application can therefore detect when certain applications are being used and can communicate that information to the management server using the power management client 133 portion of the application.

The power management client 128 can be provided in the form of non-transitory, computer-readable instructions executable by a processor 126 in the first user device 125. The memory 127 can also contain management-related data 129 that the first user device 125 can send to the management server 110. The management-related data 129 can include data pertaining to an enrollment request if the first user device 125 is not yet enrolled with the management server 110. The management-related data 129 can also include device information regarding the first user device 125, such as a device identifier, a serial number, a device type, an operating system type and version, a list of installed applications, a geographic location, and any other information pertaining to the first user device 125. The management-related data 129 can further include information pertaining to the user 135, such as an email address, home address, employer, organizational group, phone number, social security number, and taxpayer ID. In some examples, the management related data 129 is collected by an application, such as a portal application, and transmitted to the management server 110 from the portal application.

The memory 127 can also contain various applications and programs such as an email application (for example, Microsoft Outlook® or Gmail®), a word processor (Microsoft Word® for example), and a web browser (for example, Mozilla Firefox® or Google Chrome®). Some or all of these programs and applications can be tailored for use on a smartphone when the first user device 125 is a smartphone. These tailored versions, which can be more compact and have a form factor suited for display on a display screen of a smartphone, can be different from the email application versions that are executed in a laptop computer or desktop computer. Information pertaining to these applications and programs can be a part of the management-related data 129 for conveying to the management server 110 as a part of a power management scheme.

The second user device 130 can include a memory 132 having stored thereon, a power management client 133. The power management client 133 can be similar to the power management client 128 in the first user device 125 and can be provided in the form of non-transitory instructions executable by a processor 131 in the second user device 130.

The memory 132 can also contain management-related data 134 that the second user device 130 can send to the management server 110. The management-related data 134 can include data pertaining to an enrollment request if the second user device 130 is not yet enrolled with the management server 110. The management-related data 134 can also include information regarding the second user device 130, such as a device identifier, a serial number, a device type, an operating system type and version, a list of installed applications, a geographic location, and any other information pertaining to the second user device 130. The management-related data 134 can also include information pertaining to the user 135, such as an email address, home address, employer, organizational group, phone number, social security number, and taxpayer ID. In some examples, the management related data 134 is collected by an application, such as a portal application, and transmitted to the management server 110 from the portal application.

The memory 132 can also contain various applications and programs such as an email application (for example, Microsoft Outlook® or Gmail®), a word processor (Microsoft Word® for example), and a web browser (for example, Mozilla Firefox® or Google Chrome®). Information pertaining to these applications and programs can be a part of the management-related data 134 conveyed to the management server 110.

Each of the email server 115 and the Internet web server 140 can be a single computer or a network of computers for offering email services and web services to the first user device 125 and the second user device 130.

Figure 2:
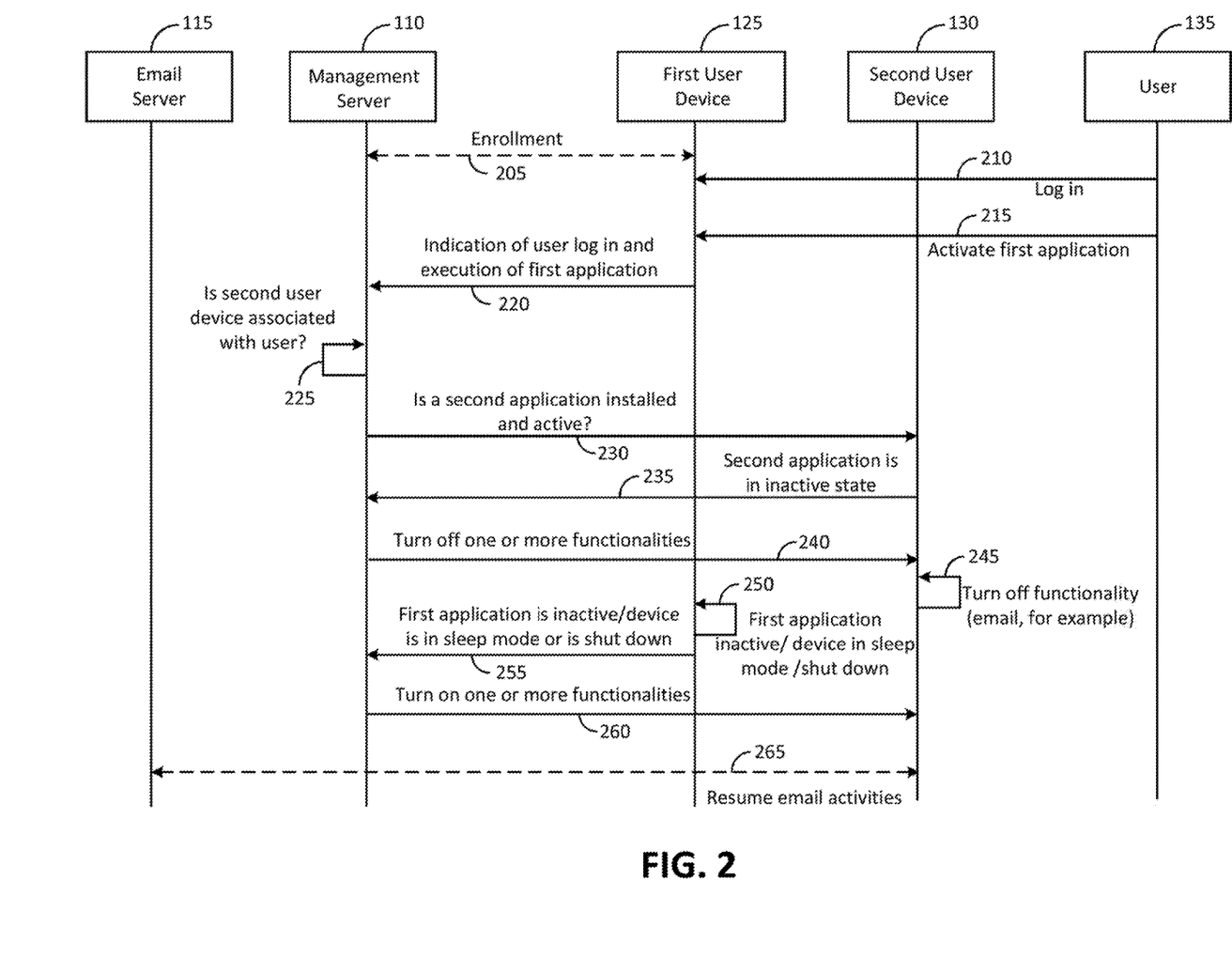
FIG. 2 is a sequence diagram of an example method for reducing power consumption among multiple devices.

FIG. 2 is a sequence diagram of an example method for reducing power consumption among multiple devices such as the first user device 125 and the second user device 130. Step 205, which can be a one-time operation that is not necessarily repeated each and every time the first user device 125 is powered up, pertains to an enrollment procedure for enrolling the first user device 125 with the management server 110. The enrollment procedure can include various back-and-forth communications between the management server 110 and the first user device 125 such as an enrollment request sent by the first user device 125 to the management server 110. In one example, some or all of the management-related data 129 is transferred to the management server 110 along with the enrollment request and stored in the registry 114. In another example, the registry 114 can be omitted in the memory 112 and some or all of the management-related data 129 is transferred to the management server 110 on as needed-basis. In this example, the management server 110 can seek specific information such as user ID, user credentials, and device particulars, from the first user device 125 at the time of enrollment or at other times when needed.

In step 210, the user 135 executes a login procedure upon the first user device 125. The login procedure can include unlocking the device 125, such as by providing credentials or biometric identification, or it can include simply powering on the device 125, in some examples. In step 215, the user 135 activates an application such as an email service or a word processor program in the first user device 125. This can be done by selecting the icon of the application from the home screen of the device 125 or from a user interface provided by a portal application, for example. In step 220, an indication is sent from the first user device 125 to the management server 110 that the first user device 125 is in an active state. The active state can be determined in various ways such as by detecting the login procedure carried out in step 210, or by other actions performed by the user 135 upon the first user device 125. For example, the active state can be determined based on the display of the first user device 125 being turned on, based on the last time the user provided touch input to the first user device 125, the processor usage of the first user device 125, whether the device 125 is being held, moved, or picked up, and so on. Step 220 can further indicate that the user 135 is executing the application that has been activated at the first user device 125.

In step 225, the management server 110 verifies that the second user device 130 is associated with the user 135. In one example, the verification can be carried out by using the management-related data 129 that was provided by the first user device 125 to the management server 110 during the enrollment procedure carried out in step 205. In another example, the verification can be carried out by using the management-related data 134 provided by the second user device 130 to the management server 110 when the second user device 125 enrolled with the management server 110. The enrollment procedure (not shown) for the second user device 130 can be similar to the one described above with reference to the first user device 125 in step 205. In this case, some or all of the management-related data 134 stored in the second user device 130 can be provided to the management server 110 in lieu of, or in addition to, the management-related data 129 stored in the first user device 125. In some examples, the management server 110 can determine that the two devices 125, 130 are enrolled to the same user 135 prior to the steps shown in FIG. 2 and at any point after enrollment of the two devices 125, 130. In some examples, the management server 110 can make the determination without enrollment of one or more of the devices 125, 130, such as when the user 135 installs a managed application that can communicate with the management server 110 independently.

In step 230, the management server 110 transmits a query to the second user device 130. The query can be initiated by the power management controller 113 for determining if a second application is installed and active in the second user device 130. The second application can be an email service or a word processor program, for example. Alternatively, the management server 110 can verify whether the second application is installed and active in the second user device 130 by referring to the registry 114 that contains management-related data 134 (or by accessing the management-related data 134 stored in the second user device 130).

In step 235, the second user device 130 informs the management server 110 that the second application is installed in the second user device 130 and that the second application is currently in an inactive state. For example, the user 135 may have set aside a smartphone (second user device 130) and the second application (an email application for example) is currently either unopened or is in an inactive state.

In step 240, the management server 110 sends an instruction to the second user device 130 to turn off one or more functionalities. For example, the management server 110 can send an instruction to the second user device 130 to execute one or more of various actions such as shutting down the email application, stopping email sync operations, stopping email fetch operations, shutting down a browser, placing the smartphone in a sleep mode of operation or a lower-power mode of operation, adjusting display brightness, turning off location services, or turning off the smartphone. In step 245, the second user device 130 executes the instruction provided by the management server 110. This action can be carried out by the power management client 133 in the second user device 130.

In step 250, the first application that was activated by the user 135 in the first user device 125 turns inactive or is shut down. For example, the user 135 shuts down the email application in the laptop computer at the end of the workday before heading home. This can include closing the application or shutting down the computer itself, for example. In another example, the first application can be considered inactive when it has not been used within a threshold period of time, such as one hour. This action is conveyed to the management server 110 in step 255.

In step 260, the management server 110 instructs the second user device 130 (the smartphone in this example) to turn on the one or more functionalities that were turned off in step 245. For example, the email application in the second user device 130 is turned back on and resumes email operations such as email fetches from the email server 115. The resumption of email activities is indicated in step 265.

At least some of the steps described above can be carried out by interactions between the power management controller 113 in the management server 110, the power management client 128 in the first user device 125, and the power management client 133 in the second user device 130, without intervention from the user 135. For example, step 245 in which the second user device 130 executes the instruction provided by the management server 110 can be carried out by the power management client 133 without intervention by the user 135. As such, the user 135 may be unaware that battery power is being automatically conserved in the smartphone.

However, in an example implementation, the user 135 can opt out of participating in the power conservation scheme over some periods of time or can opt to participate in the power conservation scheme in an optional manner. For example, the user 135 may desire to have the email application in the smartphone (second user device 130) execute email fetch operations even when the smartphone is not in use. If so, the user 135 can configure the power management client 133 in the smartphone to disregard the instruction provided by the management server 110 in step 240.

Figure 3:
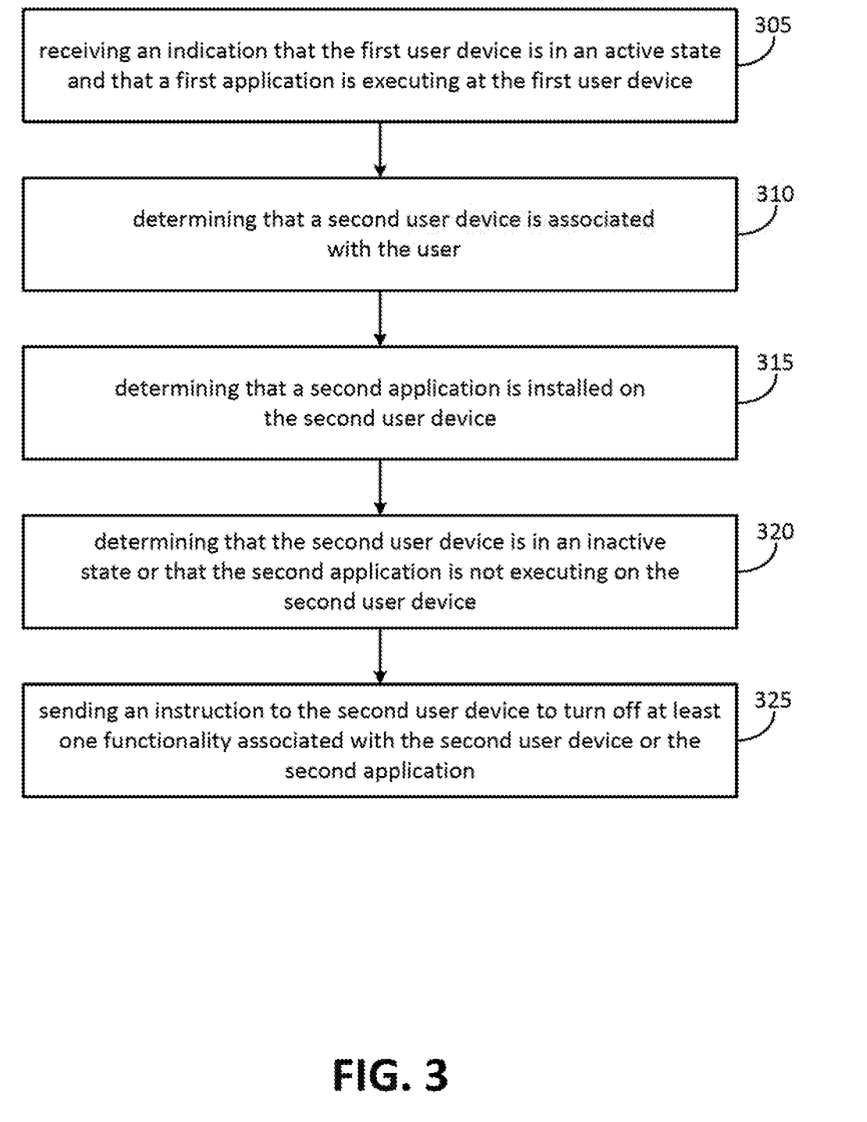
FIG. 3 is a flowchart of an example method for reducing power consumption among multiple devices.

FIG. 3 is a flowchart of an example method for reducing power consumption among multiple devices such as the first user device 125 and the second user device 130. At stage 305, the management server 110 receives an indication that the first user device 125 is in an active state and that a first application is active at the first user device 125. For example, the management server 110 may determine that the first user device 125 is in an active state based on a login request received from the first user device 125. As another example, the management server 110 may determine that the first user device 125 is in an active state based on one or more messages communicated between the first user device 125 to the management server 110. The messages can include for example, an interrogation message sent by the management server 110 to the first user device 125 and a response provided by the first user device 125 to the management server 110. The response can include portions of the management-related data 129 pertaining to management policies, compliance policy, and licenses. In yet another example, the management server 110 may determine that the first user device 125 is in an active state based on heartbeat signals transmitted by the first user device 125 to the management server 110.

The heartbeat signals can provide various types of information about the first user device 125, such as a first application that is in use at the first user device 125, a time when a second application was last used, an identification code of the first user device 125, a current location of the first user device 125, and whether the current location is outside a geofenced area. With respect to the last time an application was used, the heartbeat signal can include data related to various applications on the user device 125. In some examples, a portal application can send the information as part of a heartbeat signal or an interrogator sample. The data can include a time of last use for any application for which the portal application provides access. For instance, in an example where the portal application provides access to an email application and a document repository application, the portal application can provide data to the management server 110 indicating a time of last use for each of the email application and document repository application. When an application is currently being used at the time the portal application sends the data, the time of last use can indicate that the application is currently being used.

The information provided in the heartbeat signal or interrogator response can be sent automatically, such as at predetermined time intervals such as every 5 minutes, 15 minutes, or each hour. In some examples, the management server 110 can request a data load on demand by calling an API at the user device 125 or an application executing on the user device 125, such as a portal application. That information can be automatically stored in a database accessible to the management server 110. The management server 110 can then make an API call to that database to retrieve the information as needed.

At stage 310, the management server 110 determines that the second user device 130 is associated with the user 135. This operation can be carried out by the processor 111 at the management server 110 by accessing the memory 112, specifically the registry 114 that contains management-related data 134, or by communicating with the second user device 130 for obtaining relevant information from the management-related data 134 stored in the second user device 130.

At stage 315, the management server 110 determines that a second application is associated with the user 135. This operation can be carried out by the processor 111 in a manner that is similar to that described above with reference to stage 310. In one example, the second application is different than the first application that is being executed on the first user device 125. For example, the second application that is being executed in the second user device 130 can be a word processing application whereas the first application that is being executed on the first user device 125 is an email service. In another example, the second application is identical to, or substantially similar to the first application that is being executed on the first user device 125. For example, the second application can be a word processing application executing on a desktop computer (second user device 130) and the first application that is being executed on a laptop computer (the first user device 125) is also a word processing application that is identical to, or substantially similar to, the word processing application executing on the desktop computer.

At stage 320, the management server 110 determines that the second user device 130 is in an inactive state or that the second application is not executing on the second user device 130. This determination can be carried out in various ways. For example, the management server 110 can determine that the second user device 130 is inactive after failing to receive a heartbeat signal from the second user device 130 beyond a preset threshold period of time.

At stage 325, the management server 110 sends an instruction to the second user device 130 to turn off one or more functionalities. For example, the management server 110 can send an instruction to the second user device 130 to execute one or more of various actions such as shutting down the email application, stopping email synch operations, stopping email fetch operations, shutting down a browser, placing the smartphone in a sleep mode of operation, adjusting display brightness, or turning off the smartphone. In some examples, shutting down the email application or a browser can be performed based on the email application or browser being a managed application that is managed by the management server 110. In those examples, the management server 110 can utilize API calls to the user device 130 that are carried out based on the administrative privileges of the management server 110. In some examples, such as where the second user device 130 is a laptop computer running Windows®, an agent running on the laptop can have administrative privileges that include powering down the device 130 or adjusting screen brightness. The management server 110 can provide an instruction to the agent to perform those actions.

The management server 110 can also send an instruction to the second user device 130 to turn off the second application and one or more other applications. The actions carried out by the second user device 130 in response to the instructions received from the management server 110 result in conserving power in the second user device 130. When the second user device 130 is a battery-operated device such as a smartphone, the power conservation equates to lower battery drain and an extension of battery usage time.

With respect to stopping email synchronization, the management server 110 can instruct an email client on the user device 125, 130 to turn off an email synchronization function. This instruction can be performed through an API call in some examples. The instruction can cause the email client to cease performing the email synchronization procedure until instructed otherwise or until a predetermined time period elapses. For example, the management server 110 can instruct the email client to stop email synchronization for one hour. If the user 135 starts using the device 125, 130 or email client before that hour has elapsed, the management server 110 can instruct the email client to resume email synchronization. In some examples, the instruction from the management server 110 includes a conditional instruction to automatically resume email synchronization whenever the user device 125, 130 and/or email client becomes active again. When the email client is not synchronizing, it will not ping the email server. Even if the device 125, 130 receives a push notification update, the email client would not synchronize unless instructed to do so by the management server 110 or based on the user attempting to use the device 125, 130 or the email client. In the case of a managed laptop computer, the agent executing on the computer can use scripts that disable or terminate certain applications, causing the computer to stop email synchronization (or other relevant operations as described previously).

Stage 310 through stage 325 described above can be repeated for additional user devices associated with the user 135. For example, at stage 310, the management server 110 can determine that a third user device is associated with the user 135 and the subsequent stages can be executed in order to reduce power consumption in the third user device.

Figure 4:
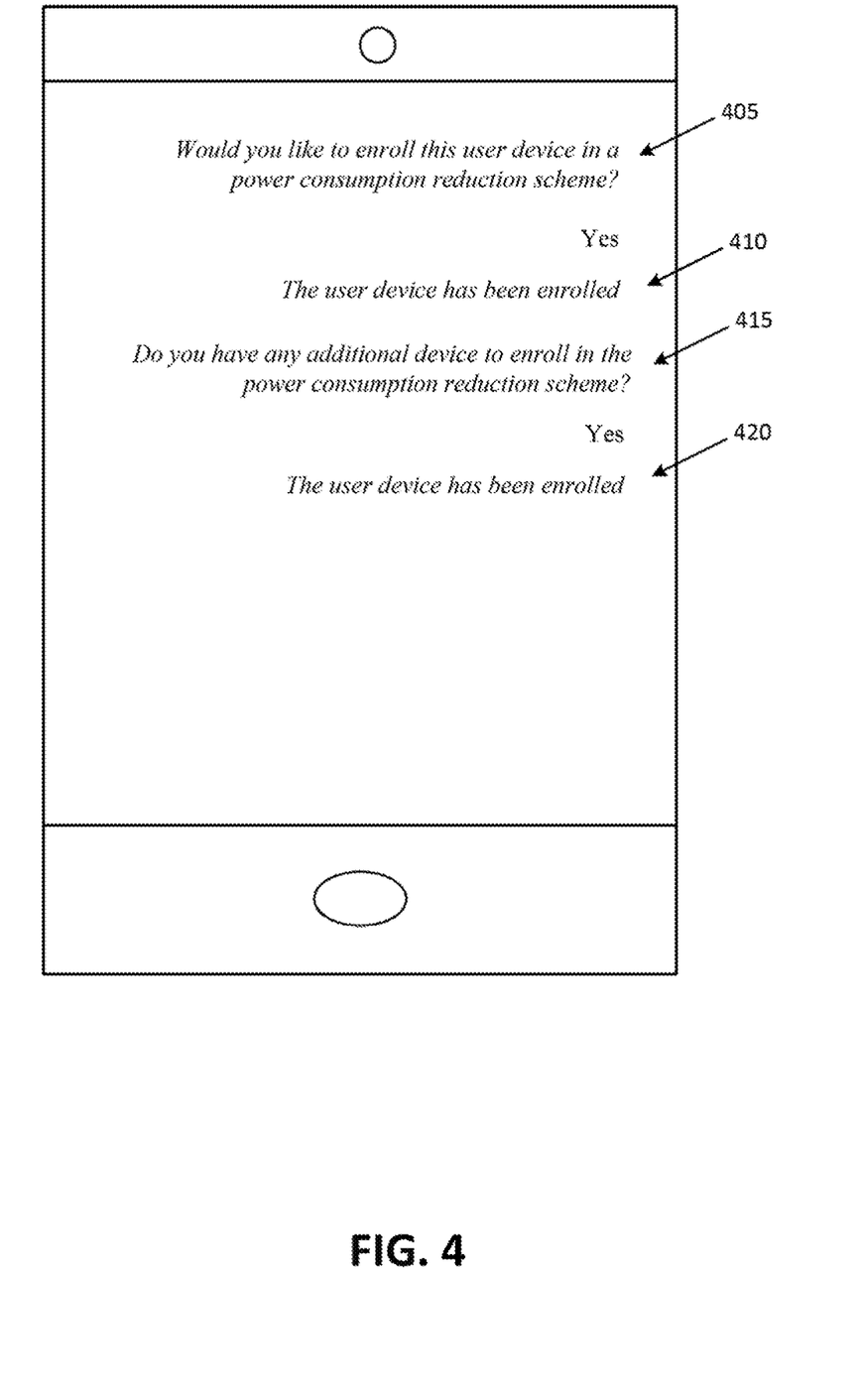
FIG. 4 is an illustration of an example graphical user interface ("GUI") displayed on a user device.

FIG. 4 is an illustration of an example graphical user interface ("GUI") 400 displayed on a user device such as the first user device 125 or the second user device 130. The GUI 400, which can be provided upon a display screen of the user device, can be operated upon by the user 135 to carry out various actions such as enrolling the first user device 125 with the management server. In one example, a message 405 is provided in the form of a first question such as: "Would you like to enroll this user device in a power consumption reduction scheme?" If the user 135 provides a "yes" response, the management server 110 can communicate with the first user device 125 to automatically obtain information from the management-related data 129 stored in the memory 127 of the first user device 125. The management server 110 can store the information in the registry 114 and configure the power management controller 113 to interact with the first user device 125 for executing the power consumption reduction scheme. After enrollment, an acknowledgement message 410 can be displayed on the GUI 400 to inform the user 135 that the enrollment has been completed successfully.

Another message 415 such as: "Do you have any additional device to enroll in the power consumption reduction scheme?" can then be displayed on the GUI 400. If the user 135 wishes to enroll the second user device 130, the management server 110 can communicate with the second user device 130 to automatically obtain information from the management-related data 134 stored in the memory 132 of the second user device 130. The management server 110 can store the information in the registry 114 and configure the power management controller 113 to interact with the second user device 130 for executing the power consumption reduction scheme. After enrollment, an acknowledgement message 420 can be displayed on the GUI 400 to inform the user 135 that the enrollment has been completed successfully. The procedure can then be repeated for any additional user devices associated with the user 135.

The message 405, message 410, and other such messages can be displayed upon the GUI 400 in various formats. For example, the messages can be displayed sequentially in the form of text messages or can be displayed concurrently on a web page. The format can be adapted in accordance with the nature of the various user devices. Graphical elements, such as buttons, can be provided for the user to provide input in response to the messages shown in FIG. 4.

Figure 5:
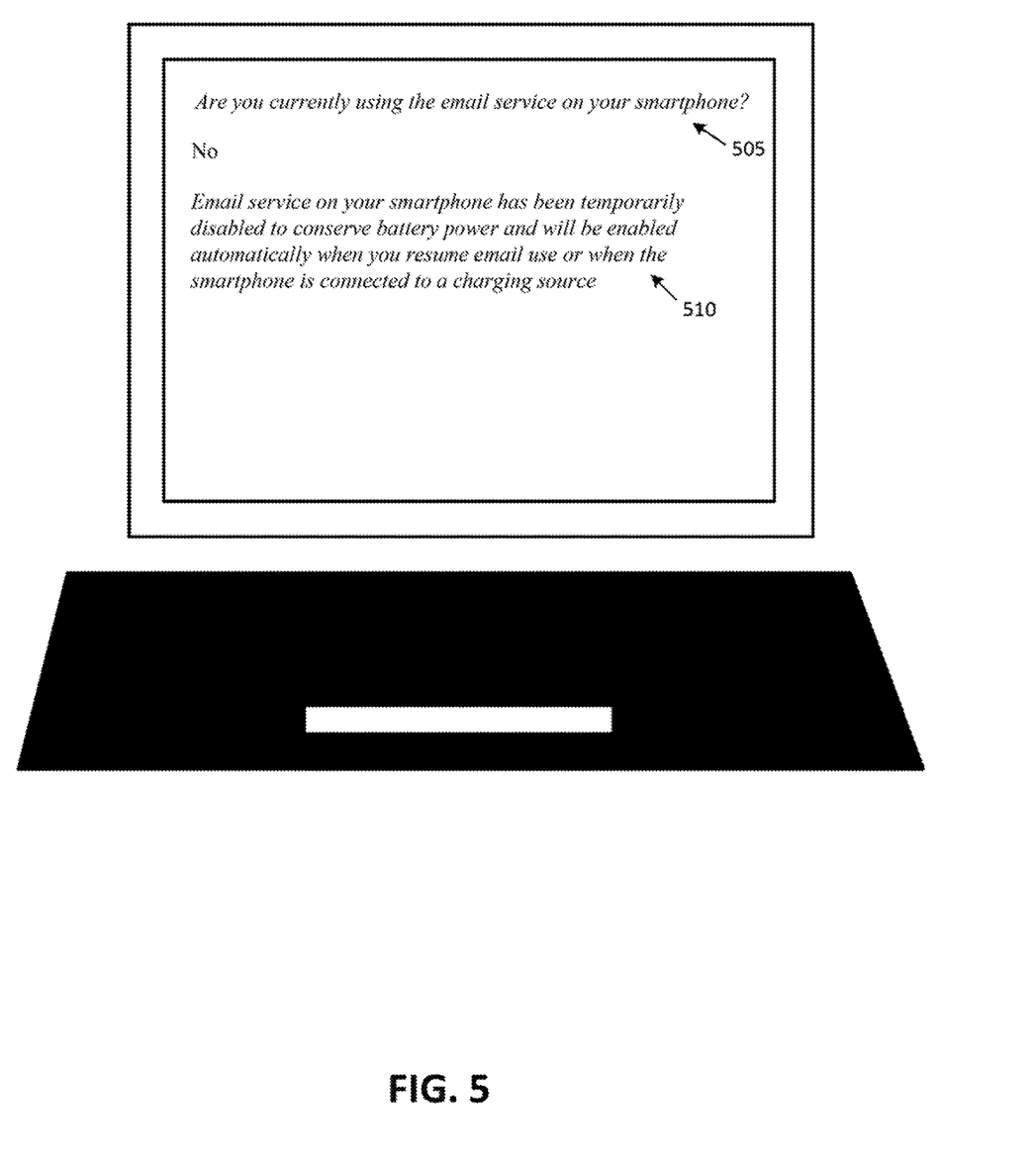
FIG. 5 is an illustration of another example GUI displayed on a user device.

FIG. 5 is an illustration of an example GUI 500 displayed on a user device such as the first user device 125 or the second user device 130. The GUI 500, which can be provided upon a display screen of the user device in various formats such as in the form of a web page of a browser or as interactive text, can be used by the user 135 to carry out various actions such as informing the management server 110 to desist from instructing a user device to enter a power down mode.

In one example, a message 505 can be provided upon a laptop computer (first user device 125) in the form of a first question such as: "Are you currently using the email service on your smartphone?" If the user 135 responds to the message 505 by indicating that the smartphone is not being used currently for emails, the management server 110 can proceed with instructing the smartphone to carry out various power reduction actions such as shutting down the email application. After the email service has been shut down, a message 510 such as "Email service on your smartphone has been temporarily disabled to conserve battery power and will be enabled automatically when you resume email use or when the smartphone is connected to a charging source" can be displayed on the laptop computer. The management server 110 can monitor the smartphone to detect activity on the smartphone such as resumption of a heartbeat and automatically resume email service on the smartphone.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather, any feature of any example described here can be incorporated into any other suitable example. It is intended that the specification and examples be considered as exemplary only, with a true scope and spirit of the disclosure being indicated by the following claims.

What is claimed is:

1. A method for reducing power consumption among first and second user devices of a user, comprising:
   receiving, at a management server from the first user device, an indication that the first user device is in an active state and that a first application is executing at the first user device;
   determining, by the management server, that a second user device is associated with the user;
   determining, by the management server, that a second application is installed on the second user device;
   determining, by the management server, that the second user device is in an inactive state or that the second application is not executing on the second user device; and
   sending an instruction to the second user device to turn off at least one functionality associated with the second user device or the second application.

2. The method of claim 1, further comprising:
   determining that the second user device has returned to an active state; and
   turning on the at least one functionality.

3. The method of claim 1, further comprising:
   receiving an indication that the user has logged out of the first user device; and
   sending an instruction to the first user device to turn off at least one functionality associated with the first user device or the first application.

4. The method of claim 1, further comprising receiving an indication that the user has logged out of the first user device; and
   sending an instruction to the second user device to turn on the at least one functionality.

5. The method of claim 1, further comprising:
   receiving an indication that the user has terminated execution of the first application; and
   sending an instruction to the second user device to turn on the at least one functionality.

6. The method of claim 1, wherein turning off at least one functionality includes at least one of: delaying email synchronization, disabling email synchronization, initiating a power-saving mode for the second user device, closing the second application, adjusting display brightness, locking the second user device, or powering down the second user device.

7. The method of claim 1, wherein determining that the second user device is in an inactive state further comprises detecting, by the management server, at least one of: that the second user device is locked, that the second user device has not been used within a threshold period of time, that the second user device is powered off, that the second user device has failed to transmit a heartbeat signal within a threshold period of time, or that the second user device has left a geofenced area.

8. A non-transitory, computer-readable medium comprising instructions that, when executed by a processor of a management server, cause the management server to perform stages for reducing power consumption among first and second user devices of a user, the stages comprising:
   receiving, at a management server from the first user device, an indication that the first user device is in an active state and that a first application is executing at the first user device;
   determining, by the management server, that a second user device is associated with the user;
   determining, by the management server, that a second application is installed on the second user device;
   determining, by the management server, that the second user device is in an inactive state or that the second application is not executing on the second user device; and
   sending an instruction to the second user device to turn off at least one functionality associated with the second user device or the second application.

9. The non-transitory, computer-readable medium of claim 8, the stages further comprising:
   determining that the second user device has returned to an active state; and
   turning on the at least one functionality.

10. The non-transitory, computer-readable medium of claim 8, the stages further comprising:
    receiving an indication that the user has logged out of the first user device; and
    sending an instruction to the first user device to turn off at least one functionality associated with the first user device or the first application.

11. The non-transitory, computer-readable medium of claim 8, the stages further comprising:
    receiving an indication that the user has logged out of the first user device; and
    sending an instruction to the second user device to turn on the at least one functionality.

12. The non-transitory, computer-readable medium of claim 8, the stages further comprising:
    receiving an indication that the user has terminated execution of the first application; and
    sending an instruction to the second user device to turn on the at least one functionality.

13. The non-transitory, computer-readable medium of claim 8, wherein turning off at least one functionality includes at least one of: delaying email synchronization, disabling email synchronization, initiating a power-saving mode for the second user device, closing the second application, adjusting display brightness, locking the second user device, or powering down the second user device.

14. The non-transitory, computer-readable medium of claim 8, wherein determining that the second user device is in an inactive state further comprises detecting, by the management server, at least one of: that the second user device is locked, that the second user device has not been used within a threshold period of time, that the second user device is powered off, that the second user device has failed to transmit a heartbeat signal within a threshold period of time, or that the second user device has left a geofenced area.

15. A system for reducing power consumption among first and second user devices of a user, comprising:
    a memory storage including a non-transitory, computer-readable medium comprising instructions; and
    a processor that executes the instructions to carry out stages comprising:

receiving, at a management server from the first user device, an indication that the first user device is in an active state and that a first application is executing at the first user device;

determining, by the management server, that a second user device is associated with the user;

determining, by the management server, that a second application is installed on the second user device;

determining, by the management server, that the second user device is in an inactive state or that the second application is not executing on the second user device; and sending an instruction to the second user device to turn off at least one functionality associated with the second user device or the second application. providing the event to the user device for display to the user.

16. The system of claim 15, the stages further comprising: determining that the second user device has returned to an active state; and turning on the at least one functionality.

17. The system of claim 15, the stages further comprising: receiving an indication that the user has logged out of the first user device; and sending an instruction to the first user device to turn off at least one functionality associated with the first user device or the first application.

18. The system of claim 15, the stages further comprising: receiving an indication that the user has logged out of the first user device; and sending an instruction to the second user device to turn on the at least one functionality.

19. The system of claim 15, the stages further comprising: receiving an indication that the user has terminated execution of the first application; and sending an instruction to the second user device to turn on the at least one functionality.

20. The system of claim 15, wherein turning off at least one functionality includes at least one of: delaying email synchronization, disabling email synchronization, initiating a power-saving mode for the second user device, closing the second application, adjusting display brightness, locking the second user device, or powering down the second user device.

* * * * *